(12) United States Patent
Daniel et al.

(10) Patent No.: US 8,618,206 B2
(45) Date of Patent: Dec. 31, 2013

(54) PROCESS FOR PRODUCING WATER-ABSORBING POLYMER PARTICLES WITH LOW CAKING TENDENCY AND HIGH ABSORPTION UNDER PRESSURE

(71) Applicant: BASF SE, Ludwigshafen (DE)

(72) Inventors: Thomas Daniel, Waldsee (DE); Christophe Bauduin, Plankstadt (DE); Norbert Herfert, Altenstadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/792,529

(22) Filed: Mar. 11, 2013

(65) Prior Publication Data

US 2013/0187089 A1    Jul. 25, 2013

Related U.S. Application Data

(62) Division of application No. 13/348,442, filed as application No. PCT/EP2010/058987 on Jun. 24, 2010, now Pat. No. 8,410,221.

(30) Foreign Application Priority Data

Jun. 26, 2009   (EP) .................................. 09008370

(51) Int. Cl.
*C08F 8/42*         (2006.01)
*C08F 220/00*    (2006.01)
*C08K 3/34*        (2006.01)

(52) U.S. Cl.
USPC ........ 524/493; 524/557; 524/558; 525/329.5; 525/221; 526/317.1; 526/320

(58) Field of Classification Search
USPC ............... 524/493, 557, 558; 525/329.5, 221; 526/317.1, 320
See application file for complete search history.

(56) References Cited

U.S. PATENT DOCUMENTS

| 4,734,478 | A  | 3/1988 | Tsubakimoto et al. |
| 6,605,673 | B1 | 8/2003 | Mertens et al. |
| 6,620,889 | B1 | 9/2003 | Mertens et al. |

FOREIGN PATENT DOCUMENTS

| DE | 35 23 617 A1 | 1/1986 |
| WO | WO-00/53644 A1 | 9/2000 |
| WO | WO-00/53664 A1 | 9/2000 |
| WO | WO-2004/069915 A2 | 8/2004 |
| WO | WO 2004069915 A2 * | 8/2004 |

OTHER PUBLICATIONS

Buchholz, Fredric L., et al., *Modern Superabsorbent Polymer Technology*, "Commercial Processes for the Manufacture of Superabsorbent Polymers," pp. 71-103. New York: John Wiley & Sons, Inc., 1998.

International Search Report in international application No. PCT/EP2010/058987, dated Nov. 2, 2010 (translation).

* cited by examiner

*Primary Examiner* — Michael Bernshteyn
(74) *Attorney, Agent, or Firm* — Marshall, Gerstein & Borun LLP

(57) ABSTRACT

A process for producing water-absorbing polymer particles with low caking tendency and high absorption under pressure, comprising polymerization of a monomer solution or suspension, drying of the resulting polymer gel, grinding, classifying, thermal surface postcrosslinking and coating with silicon dioxide, wherein the water-absorbing polymer particles have been coated, before, during or after the surface postcrosslinking with aluminum cations.

8 Claims, No Drawings

PROCESS FOR PRODUCING WATER-ABSORBING POLYMER PARTICLES WITH LOW CAKING TENDENCY AND HIGH ABSORPTION UNDER PRESSURE

CROSS-REFERENCE TO RELATED APPLICATIONS

This is a divisional application of U.S. patent application Ser. No. 13/378,442, filed Dec. 15, 2011, now U.S. Pat. No. 8,410,221, which is the U.S. national phase of International Application No. PCT/EP2010/058987, filed Jun. 24, 2010, which claims the benefit of European Patent Application No. 09008370.0, filed Jun. 26, 2009.

The present invention relates to a process for producing water-absorbing polymer particles with low caking tendency and high absorption under pressure, wherein the water-absorbing polymer particles have been coated, before, during or after the surface postcrosslinking, with silicon dioxide and aluminum cations.

Water-absorbing polymer particles are used to produce diapers, tampons, sanitary napkins and other hygiene articles, but also as water-retaining agents in market gardening. The water-absorbing polymer particles are also referred to as super-absorbents.

The production of water-absorbing polymer particles is described in the monograph "Modern Superabsorbent Polymer Technology", F. L. Buchholz and A. T. Graham, Wiley-VCH, 1998, pages 71 to 103.

Water-absorbing polymer particles are typically obtained by polymerizing suitable aqueous monomer solutions or suspensions.

The properties of the water-absorbing polymer particles can be adjusted, for example, via the amount of crosslinker used. With the increasing amount of crosslinker, the centrifuge retention capacity (CRC) falls and the absorption under a pressure of 21.0 g/cm² (AUL0.3 psi) passes through a maximum.

To improve the performance properties, for example permeability of the swollen gel bed (SFC) in the diaper and absorption under a pressure of 49.2 g/cm² (AUL0.7 psi), water-absorbing polymer particles are generally surface postcrosslinked. This increases the degree of crosslinking of the particle surface, which allows the absorption under a pressure of 49.2 g/cm² (AUL0.7 psi) and the centrifuge retention capacity (CRC) to be decoupled at least partly. This surface postcrosslinking can be carried out in aqueous gel phase. Preferably, however, dried, ground and sieved-off polymer particles (base polymer) are surface coated with a surface postcrosslinker and thermally surface postcrosslinked. Crosslinkers suitable for this purpose are compounds which can form covalent bonds with at least two carboxylate groups of the water-absorbing polymer particles.

DE 35 23 617 A1 discloses a process for producing surface postcrosslinked water-absorbing polymer particles, wherein the free flow of the polymer particles is improved and the caking tendency is reduced by coating with silicon dioxide.

WO 00/53644 A1 and WO 00/53664 A1 describe the use of cations for improving the centrifuge retention capacity (CRC) and permeability of the swollen gel bed (SFC).

It was an object of the present invention to provide an improved process for producing water-absorbing polymer particles, especially water-absorbing polymer particles with low caking tendency and high absorption under a pressure of 49.2 g/cm² (AUL0.7 psi).

The object is achieved by a process for producing water-absorbing polymer particles by polymerizing a monomer solution or suspension comprising a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers specified under a) and
e) optionally one or more water-soluble polymers, comprising drying the resulting aqueous polymer gel, grinding, classifying and thermal surface postcrosslinking, which comprises coating the water-absorbing polymer particles, before, during or after the surface postcrosslinking, with 0.0001 to 0.25% by weight of silicon dioxide and at least $1.5 \times 10^{-6}$ mol/g of aluminum cations.

The silicon dioxide for use in the process according to the invention is preferably polysilicic acids which are distinguished, according to the method of preparation, between precipitated silicas and fumed silicas. Both variants are commercially available under the Silica FK, Sipernat®, Wessalon® (precipitated silicas) or Aerosil® (fumed silicas) names.

The silicon dioxide has a specific surface area of preferably 10 to 500 m²/g, more preferably of 20 to 250 m²/g, most preferably of 50 to 200 m²/g, and a mean particle size of 1 to 100 μm, more preferably of 2 to 50 μm, most preferably of 5 to 20 μm.

The water-absorbing polymer particles are coated with preferably 0.001 to 0.2% by weight, more preferably with 0.02 to 0.15% by weight, very particularly with 0.08 to 0.12% by weight, of silicon dioxide.

The water-absorbing polymer particles are preferably coated with silicon dioxide after the thermal surface postcrosslinking.

The mixers usable for coating with silicon dioxide are not subject to any restriction. Advantageously, mixers with moving mixing tools, such as screw mixers, disk mixers and paddle mixers, are used. Particular preference is given to horizontal mixers. The distinction between horizontal mixers and vertical mixers is made by the mounting of the mixing shaft, i.e. horizontal mixers have a horizontally mounted mixing shaft and vertical mixers have a vertically mounted mixing shaft. Suitable horizontal mixers are, for example, Ruberg continuous flow mixers (Gebrüder Ruhberg GmbH & Co KG, Nieheim, Germany).

In the process according to the invention, the water-absorbing polymer particles are coated with aluminum cations. Possible counterions are chloride, bromide, sulfate, hydrogensulfate, carbonate, hydrogencarbonate, nitrate, phosphate, hydrogen-phosphate, dihydrogenphosphate and preferably carboxylate, such as acetate and lactate.

Particular preference is given to using basic carboxylates, such as basic aluminum acetate. Very particular preference is given to aluminum monoacetate (CAS No. [7360-44-3]). In the basic carboxylates, not all hydroxide groups eliminable as hydroxyl anions (OH—) in aqueous solutions are replaced in the salt-forming bases by carboxylate groups.

The water-absorbing polymer particles are coated with preferably $2 \times 10^{-6}$ to $15 \times 10^{-6}$ mol/g (moles of aluminum cations per g of water-absorbing polymer particles), more preferably with $3 \times 10^{-6}$ to $10 \times 10^{-6}$ mol/g, very particularly with $4 \times 10^{-6}$ to $6 \times 10^{-6}$ mol/g, of aluminum cations.

The water-absorbing polymer particles are preferably coated with aluminum cations before the thermal surface postcrosslinking.

For the coating with the aluminum cations, the mixers suitable for spray application of the surface postcrosslinker are advantageously used.

The present invention is based on the finding that the absorption under a pressure of 49.2 g/cm$^2$ (AUL0.7 psi) of water-absorbing polymer particles falls as a result of coating with silicon dioxide. In order to achieve a sufficient reduction in the caking tendency, a considerable decline in the absorption under a pressure of 49.2 g/cm$^2$ (AUL0.7 psi) therefore has to be accepted.

Moreover, it has been found that aluminum cations and silicon dioxide act synergistically, such that, in the presence of aluminum cations, significantly smaller amounts of silicon dioxide bring about a sufficient reduction in the caking tendency.

The acid groups of the ethylenically unsaturated monomers bearing acid groups have preferably been neutralized to an extent of 72 to 82 mol %, more preferably to an extent of 74 to 79 mol %, most preferably of 75 to 77 mol %. The decline in the absorption under a pressure of 49.2 g/cm$^2$ (AUL0.7 psi) which is caused by the coating with silicon dioxide decreases with rising degree of neutralization, while the reaction rate of the thermal surface postcrosslinking decreases simultaneously.

The present invention is particularly advantageous for water-absorbing polymer particles with high centrifuge retention capacity (CRC). The properties of water-absorbing polymer particles with high centrifuge retention capacity (CRC) are particularly adversely affected by the coating with silicon dioxide. The additional coating with aluminum cations to reduce the amount of silicon dioxide needed is therefore particularly beneficial in this case. The centrifuge retention capacity (CRC) of the water-absorbing polymer particles obtainable by the process according to the invention is therefore preferably from 35 to 45 g/g, more preferably from 36 to 40 g/g, most preferably from 35 to 37 g/g. The centrifuge retention capacity (CRC) can be adjusted by adjusting the concentration of the crosslinker b). With rising concentration of the crosslinker b), the centrifuge retention capacity (CRC) falls and the absorption under a pressure of 21.0 g/cm$^2$ (AUL0.3 psi) passes through a maximum.

The production of the water-absorbing polymer particles is explained in detail hereinafter:

The water-absorbing polymer particles are produced by polymerizing a monomer solution or suspension and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone half ethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone half ether, based in each case on the unneutralized monomer a). For example, the monomer solution can be prepared by using an ethylenicaliy unsaturated monomer bearing acid groups with an appropriate content of hydroquinone half ether.

Preferred hydroquinone half ethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylene-bismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The initiators c) may be all compounds which generate free radicals under the polymerization conditions, for example thermal initiators, redox initiators, photo-initiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite0 FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethyl-aminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethyl-cellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. Before the polymerization, the monomer solution can therefore be freed of dissolved oxygen by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel, which has to be comminuted in a further process step, for example in an extruder or kneader.

To improve the drying properties, the comminuted polymer gel obtained by means of a kneader can additionally be extruded.

The acid groups of the resulting polymer gels have been partially neutralized. Neutralization is preferably carried out at the monomer stage. This is typically done by mixing in the neutralizing agent as an aqueous solution or preferably also as a solid. The customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then dried with a forced air belt dryer until the residual moisture content is preferably from 0.5 to 15% by weight, more preferably from 1 to 10% by weight, most preferably from 2 to 8% by weight, the residual moisture content being determined by the EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained (fines). The solids content of the gel before the drying is preferably from 25 to 90% by weight, more preferably from 35 to 70% by weight, most preferably from 40 to 60% by weight.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 μm, more preferably from 250 to 600 μm, very particularly from 300 to 500 μm. The mean particle size of the product fraction may be determined by means of the EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight, most preferably at least 98% by weight.

Polymer particles with too small a particle size lower the permeability of the swollen gel bed (SFC). The proportion of excessively small polymer particles (fines) should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for the polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until within an apparatus connected downstream of the polymerization reactor, for example an extruder, the excessively small polymer particles can be incorporated into the resulting polymer gel only with difficulty. Excessively small polymer particles which have been insufficiently incorporated, however, become detached again from the dried polymer gel during the grinding, and are therefore removed again in the classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of polymer particles with a particle size of at most 600 μm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

To further improve the properties, the polymer particles are surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidone and its derivatives, such as 2-hydroxyethyl-2-oxazolidone in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred surface postcrosslinkers are ethylene carbonate, ethylene glycol diglycidyl ether, reaction products of polyamides with epichlorohydrin, and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably from 0.001 to 2% by weight, more preferably from 0.02 to 1% by weight, most preferably from 0.05 to 0.2% by weight, based in each case on the polymer particles.

In a preferred embodiment of the present invention, before, during or after the surface postcrosslinking, in addition to the aluminum cations, further polyvalent cations are applied to the particle surface.

The further polyvalent cations usable in the process according to the invention are, for example, divalent cations such as the cations of zinc, magnesium, calcium, iron and strontium, trivalent cations such as the cations of iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Apart from metal salts, it is also possible to use polyamines as further polyvalent cations.

The amount of further polyvalent cation used is, for example, 0.001 to 1.5% by weight, preferably 0.005 to 1% by weight, more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either during or after the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta Continuous Mixers (Hosokawa Micron BV; Doetinchem; the Netherlands), Processall Mixmill Mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The temperature of the water-absorbing polymer particles in the dryer is preferably from 100 to 250° C., more preferably from 130 to 220° C., most preferably from 150 to 200° C. The residence time in the dryer is preferably from 10 to 120 minutes, more preferably from 10 to 90 minutes, most preferably from 30 to 60 minutes. The filling of the dryer is preferably from 30 to 80%, more preferably from 40 to 75%, most preferably from 50 to 70%. The filling of the dryer can be adjusted via the height of the outflow weir.

Subsequently, the surface postcrosslinked polymer particles can be classified again to remove excessively small and/or excessively large polymer particles which are recycled into the process.

The properties of the surface postcrosslinked polymer particles can be improved further by coating or remoisturizing.

The remoisturizing is performed preferably at 30 to 80° C., more preferably at 35 to 70° C., most preferably at 40 to 60° C. At excessively low temperatures the water-absorbing polymer particles tend to form lumps, and at higher temperatures water already evaporates noticeably. The amount of water used for remoisturizing is preferably from 1 to 10% by weight, more preferably from 2 to 8% by weight, most preferably from 3 to 5% by weight. The remoisturizing increases the mechanical stability of the polymer particles and reduces the tendency thereof to static charging.

Suitable coatings for improving the swell rate and the permeability of the swollen gel bed (SFC) are, for example, inorganic inert substances such as water-insoluble metal salts, organic polymers, cationic polymers and di- or polyhydric metal cations. Suitable coatings for dust binding are, for example, polyols.

The present invention further provides the water-absorbing polymer particles obtainable by the process according to the invention.

The present invention further provides water-absorbing polymer particles composed of crosslinked polymers bearing acid groups which have been neutralized to an extent of 70 to 85 mol %, comprising 0.0001 to 0.25% by weight of silicon dioxide and at least $1.5 \times 10^{-6}$ mol/g of aluminum cations.

The water-absorbing polymer particles comprise preferably 0.001 to 0.2% by weight, more preferably 0.02 to 0.15% by weight, very particularly 0.08 to 0.12% by weight, of silicon dioxide.

The water-absorbing polymer particles comprise preferably $2 \times 10^{-6}$ to $15 \times 10^{-6}$ mol/g, more preferably $3 \times 10^{-6}$ to $10 \times 10^{-6}$ mol/g, very particularly $4 \times 10^{-6}$ to $6 \times 10^{-6}$ mol/g, of aluminum cations.

The acid groups of the water-absorbing polymer particles have preferably been neutralized to an extent of 72 to 82 mol %, more preferably to an extent of 74 to 79 mol %, most preferably of 75 to 77 mol %.

The inventive water-absorbing polymer particles have a centrifuge retention capacity (CRC) of preferably from 25 to 45 g/g, more preferably from 30 to 40 g/g, most preferably from 35 to 37 g/g. The centrifuge retention capacity (CRC) is determined by EDANA recommended test method No. WSP 241.2-05 "Centrifuge Retention Capacity".

The inventive water-absorbing polymer particles have a moisture content of preferably 0 to 15% by weight, more preferably 0.2 to 10% by weight, most preferably 0.5 to 8% by weight, the moisture content being determined by EDANA recommended test method No. WSP 230.2-05 "Moisture Content".

The inventive water-absorbing polymer particles have an absorption under a pressure of 49.2 g/cm² (AUL0.7 psi) of typically at least 15 g/g, preferably at least 18 g/g, preferentially at least 20 g/g, more preferably at least 21 g/g, most preferably at least 22 g/g. The absorption under a pressure of 49.2 g/cm² (AUL0.7 psi) of the water-absorbing polymer particles is typically less than 30 g/g. The absorption under a pressure of 49.2 g/cm² (AUL0.7 psi) is determined analogously to EDANA recommended test method No. WSP 242.2-05 "Absorption under Pressure", except setting a pressure of 49.2 g/cm² instead of a pressure of 21.0 g/cm².

The present invention further provides hygiene articles comprising inventive water-absorbing polymer particles. The hygiene articles typically comprise a water-impervious backside, a water-pervious topside and, in between, an absorbent core composed of the inventive polymer particles and cellulose fibers. The proportion of the inventive polymer particles in the absorbent core is preferably 20 to 100% by weight, preferentially 50 to 100% by weight.

The water-absorbing polymer particles are tested by means of the test methods described below.

Methods:

The measurements should, unless stated otherwise, be carried out at an ambient temperature of 23±2° C. and a relative air humidity of 50±10%. The water-absorbing polymer particles are mixed thoroughly before the measurement.

Centrifuge Retention Capacity

The centrifuge retention capacity (CRC) is determined by EDANA recommended test method No. WSP 214.2-05 "Centrifuge Retention Capacity".

Absorption Under a Pressure of 49.2 g/cm²

The absorption under a pressure of 49.2 g/cm² (AUL0.7 psi) is determined analogously to EDANA recommended test method No. WSP 242.2-05 "Absorption under Pressure", with a pressure setting of 49.2 g/cm² (AUL0.7 psi) instead of 21.0 g/cm² (AUL0.3 psi).

Caking

To determine the caking tendency, the empty weight (Wd) of an aluminum dish (diameter 5.7 cm) is determined. Subsequently, 5 g of water-absorbing polymer particles are weighed into the aluminum dish, and the aluminum dish covered with the water-absorbing polymer particles is placed in a climate-controlled cabinet at 40° C. and 80% relative air humidity for one hour.

After the storage, the aluminum dish covered with the water-absorbing polymer particles is weighed and the weight (WHYD) is noted.

Subsequently, the empty weight (WPAN) of a screen (mesh size 1.7 mm and diameter 76.2 mm) is determined, and the water-absorbing polymer particles are placed onto the screen and screened by means of a vibration screening machine (amplitude 0.2 cm) for one minute.

After the screening, the screen covered with the water-absorbing polymer particles is weighed and the weight (WUNC) is noted.

The caking tendency is calculated by $$\text{Caking} = \frac{WUNG - WPAN}{WHYD - Wd}$$

The caking tendency reports the proportion by weight of water-absorbing polymer particles which have formed lumps, and the lower the value is, the lower the caking is.

The EDANA test methods are obtainable, for example, from EDANA, Avenue Eugene Plasky 157, B-1030 Brussels, Belgium.

EXAMPLES 5009 g of a 37.3% by weight aqueous sodium acrylate solution were mixed with 477 g of acrylic acid and 430 g of water, and inertized with nitrogen. This mixture was introduced into a nitrogen-inertized Werner & Pfleiderer LUK 8.0 K2 kneader (2 Sigma shafts), and admixed successively with 9.0 g of polyethylene glycol diacrylate (diacrylate of a polyethylene glycol with a mean molar mass of 400 g/mol), 4.4 g of a 1.0% by weight aqueous ascorbic acid solution, 18.1 g of a 15% by weight aqueous sodium persulfate solution and 3.9 g of a 3% by weight aqueous hydrogen peroxide solution. The kneader was stirred at maximum speed (approx. 98 rpm of the faster shaft, approx. 49 rpm of the slower shaft, ratio approx. 2:1). Immediately after the addition of hydrogen peroxide, the kneader jacket was heated with heat carrier at 80° C. On attainment of the maximum temperature, the jacket heating was switched off and the mixture was allowed to react in the kneader for a further 15 minutes. The resulting polymer gel was cooled to 65° C. and emptied. The polymer gel was dried at 175° C. for 75 minutes with a loading of 700 g per metal sheet in a forced-air drying cabinet. After grinding three times in a roll mill (Gebr. Baumeister LRC 125/70, gap widths 1000 μm, 600 μm, 400 μm), the polymer particles were screened off to a screening fraction between 850 and 100 μm.

The resulting water-absorbing polymer particles had a degree of neutralization of 75 mol %. Water-absorbing polymer particles with a degree of neutralization of 72 mol % and 77 mol % were obtained analogously by adjusting the amounts of sodium acrylate solution, acrylic acid and water, while the solids content of the monomer solution was kept constant.

1000 g of these polymer particles were transferred into a Gebr. Lödige laboratory mixer (M5R). At approx. 23° C., a mixture of 0.6 g of 2-hydroxyethyloxazolidin-2-one, 0.6 g of 1,3-propanediol, 16.5 g of water, 11.5 g of 2-propanol and an aqueous aluminum salt solution (1 g, 2 g, 4 g or 6 g of 25% by weight aluminum lactate [18917-91-4], 2.4 g or 3.6 g of 26.8% by weight aluminum sulfate [10043-01-3] or 1.6 g or 2.4 g of 17.4% by weight basic aluminum acetate [7360-44-3]) were sprayed on via a nozzle. The sprayed polymer particles were transferred into another Gebr. Lödige laboratory mixer which was heated rapidly to 170° C., 175° C. or 180° C. and kept at this temperature for 60 minutes. After cooling, the surface postcrosslinked polymer particles were screened off to a screening fraction between 850 and 100 μm.

In a 500 ml glass bottle, 100 g of surface postcrosslinked polymer particles were optionally mixed with 0.1 g, 0.2 g or 0.3 g of silicon dioxide (Sipernat® D17) for 15 minutes by means of a Turbula® T2F mixer (Willy A. Bachofen AG Maschinenfabrik; Muttenz; Switzerland) at 45 rpm.

The resulting water-absorbing polymer particles were analyzed. The results are compiled in the following tables:

TABLE 1

Degree of neutralization 72 mol % and surface postcrosslinking at 170° C.

| Ex. | $Al^{3+}$ [$10^{-6}$ mol/g] | before $SiO_2$ addition | | | $SiO_2$ [% by wt.] | after $SiO_2$ addition | | |
|---|---|---|---|---|---|---|---|---|
| | | Caking [%] | CRC [g/g] | AUL0.7 psi [g/g] | | Caking [%] | CRC [g/g] | AUL0.7 psi [g/g] |
| 1*) | 0 | | 36.3 | 22.9 | 0.1 | 32.8 | | |
| 2*) | | | | | 0.2 | 7.0 | | |
| 3*) | | | | | 0.3 | 5.1 | | |
| 4*) | 0.85 | | 35.0 | 23.8 | 0.1 | 30.6 | 35.8 | 19.8 |
| 5*) | | | | | 0.2 | 10.7 | 36.0 | 17.3 |
| 6*) | | | | | 0.3 | 3.0 | 35.3 | 17.0 |
| 7*) | 1.7 | | 34.5 | 23.2 | 0.1 | 19.9 | 36.4 | 19.0 |
| 8*) | | | | | 0.2 | 17.1 | 35.4 | 17.3 |
| 9*) | | | | | 0.3 | 1.1 | 35.4 | 17.4 |
| 10 | 3.4 | 68.1 | 35.7 | 24.4 | 0.1 | 0.8 | 36.3 | 20.0 |
| 11 | | | | | 0.2 | 0.7 | 36.5 | 18.4 |
| 12 | | | | | 0.3 | 0.9 | 36.2 | 17.8 |
| 13 | 5.1 | 65.0 | 35.9 | 25.0 | 0.1 | 0.9 | 35.8 | 20.7 |
| 14 | | | | | 0.2 | 1.0 | 35.6 | 18.3 |
| 15 | | | | | 0.3 | 1.1 | 35.2 | 18.3 |

*)Comparative example

TABLE 2

Degree of neutralization 75 mol % and surface postcrosslinking at 175° C.

| Ex. | $Al^{3+}$ [$10^{-6}$ mol/g] | before $SiO_2$ addition | | | $SiO_2$ [% by wt.] | after $SiO_2$ addition | | |
|---|---|---|---|---|---|---|---|---|
| | | Caking [%] | CRC [g/g] | AUL0.7 psi [g/g] | | Caking [%] | CRC [g/g] | AUL0.7 psi [g/g] |
| 16*) | 0 | 99.5 | 35.9 | 23.0 | 0.1 | 61.3 | 36.1 | 20.8 |
| 17*) | | | | | 0.2 | 34.6 | 35.8 | 20.1 |
| 18*) | | | | | 0.3 | 8.9 | 35.6 | 19.6 |
| 19 | 3.4 | 97.6 | 35.8 | 25.6 | 0.1 | 1.0 | 35.9 | 22.3 |
| 20 | | | | | 0.2 | 0.7 | 35.6 | 21.9 |
| 21 | | | | | 0.3 | 0.6 | 35.2 | 21.3 |
| 22 | 5.1 | 87.2 | 34.8 | 24.6 | 0.1 | 0.7 | 35.4 | 23.0 |
| 23 | | | | | 0.2 | 0.3 | 35.4 | 21.4 |
| 24 | | | | | 0.3 | 0.6 | 34.3 | 20.9 |

*)Comparative example

TABLE 3

Degree of neutralization 77 mol % and surface postcrosslinking at 175° C.

| | Al$^{3+}$ | before SiO$_2$ addition | | | after SiO$_2$ addition | | |
|---|---|---|---|---|---|---|---|
| Ex. | [10$^{-6}$ mol/g] | Caking [%] | CRC [g/g] | AUL0.7 psi [g/g] | SiO$_2$ [% by wt.] | Caking [%] | CRC [g/g] | AUL0.7 psi [g/g] |
| 25*) | 0 | 100.0 | 36.9 | 21.6 | 0.1 | 10.6 | 37.4 | 16.5 |
| 26*) | | | | | 0.2 | 6.3 | 37.3 | 14.3 |
| 27 | 3.4 | 92.3 | 37.9 | 21.3 | 0.1 | 0.6 | 38.2 | 16.6 |
| 28 | | | | | 0.2 | 0.3 | 38.6 | 14.1 |
| 29 | 5.1 | 66.4 | 37.2 | 19.6 | 0.1 | 1.1 | 38.7 | 16.4 |
| 30 | | | | | 0.2 | 0.8 | 37.3 | 14.4 |

*)Comparative example

TABLE 4

Degree of neutralization 77 mol % and surface postcrosslinking at 180° C.

| | Al$^{3+}$ | before SiO$_2$ addition | | | after SiO$_2$ addition | | |
|---|---|---|---|---|---|---|---|
| Ex. | [10$^{-6}$ mol/g] | Caking [%] | CRC [g/g] | AUL0.7 psi [g/g] | SiO$_2$ [% by wt.] | Caking [%] | CRC [g/g] | AUL0.7 psi [g/g] |
| 31*) | 0 | 99.9 | 35.3 | 22.1 | 0.1 | 9.8 | 35.6 | 19.2 |
| 32 | 3.4 | 94.2 | 35.9 | 25.3 | 0.1 | 1.0 | 36.7 | 20.1 |
| 33 | | | | | 0.2 | 0.0 | 36.7 | 19.3 |
| 34 | 5.1 | 51.7 | 34.5 | 23.2 | 0.1 | 0.8 | 35.9 | 22.0 |
| 35 | | | | | 0.2 | 0.5 | 35.6 | 19.9 |

*)Comparative example

The results in tables 1 to 4 demonstrate the synergistic effect of aluminum cations and silicon dioxide in the reduction of the caking tendency of water-absorbing polymer particles.

In addition, the results show that, in the event of an increase in the degree of neutralization by 2 to 3 mol %, the temperature in the thermal surface postcrosslinking has to be raised by approx. 5° C. in order to obtain comparable values for the centrifuge retention capacity (CRC) and the absorption under pressure (AUL0.7 psi).

In addition, the decline in the absorption under pressure (AUL0.7 psi) at a degree of neutralization of 75 mol %, which is caused by the coating with silicon dioxide, passes through a minimum.

TABLE 5

Degree of neutralization 72 mol %, surface postcrosslinking at 170° C. and 3.4 × 10$^{-6}$ mol/g Al$^{3+}$

| | | before SiO$_2$ addition | | | after SiO$_2$ addition | | |
|---|---|---|---|---|---|---|---|
| Ex. | Aluminum salt | Caking [%] | CRC [g/g] | AUL0.7 psi [g/g] | SiO$_2$ [% by wt.] | Caking [%] | CRC [g/g] | AUL0.7 psi [g/g] |
| 36 | Lactate | | 35.7 | 24.4 | 0.1 | 0.8 | 36.3 | 20.0 |
| 37 | | | | | 0.2 | 0.7 | 36.5 | 18.4 |
| 38 | Sulfate | | 37.3 | 19.8 | 0.1 | 26.7 | 38.0 | 15.3 |
| 39 | | | | | 0.2 | 3.3 | 37.5 | 13.5 |
| 40 | Acetate | | 37.5 | 22.6 | 0.1 | 0.9 | 37.3 | 20.2 |
| 41 | | | | | 0.2 | 0.5 | 36.8 | 19.4 |

*)Comparative example

TABLE 6

Degree of neutralization 72 mol %, surface postcrosslinking at 170° C. and 5.1 × 10$^{-6}$ mol/g Al$^{3+}$

| | | before SiO$_2$ addition | | | after SiO$_2$ addition | | |
|---|---|---|---|---|---|---|---|
| Ex. | Aluminum salt | Caking [%] | CRC [g/g] | AUL0.7 psi [g/g] | SiO$_2$ [Gew.-%] | Caking [%] | CRC [g/g] | AUL0.7 psi [g/g] |
| 42 | Lactate | | 35.9 | 25.0 | 0.1 | 0.9 | 35.8 | 20.7 |
| 43 | | | | | 0.2 | 1.0 | 35.6 | 18.3 |
| 44 | Sulfate | | 38.7 | 18.5 | 0.1 | 5.0 | 37.7 | 14.4 |
| 45 | | | | | 0.2 | 0.0 | 38.0 | 13.4 |

TABLE 6-continued

| | | before SiO$_2$ addition | | | | after SiO$_2$ addition | | |
|---|---|---|---|---|---|---|---|---|
| Ex. | Aluminum salt | Caking [%] | CRC [g/g] | AUL0.7 psi [g/g] | SiO$_2$ [Gew.-%] | Caking [%] | CRC [g/g] | AUL0.7 psi [g/g] |
| 46 | Acetate | | 36.5 | 21.3 | 0.1 | 0.6 | 37.9 | 19.7 |
| 47 | | | | | 0.2 | 0.4 | 37.3 | 20.2 |

Degree of neutralization 72 mol %, surface postcrosslinking at 170° C. and 5.1 × 10$^{-6}$ mol/g Al$^{3+}$ The results in tables 5 and 6 show the differences when using different aluminum salts. The coating with aluminum lactate leads to water-absorbing polymer particles with the highest absorption under pressure (AUL0.7 psi). The water-absorbing polymer particles coated with basic aluminum acetate show, in contrast, the smallest decline in the absorption under pressure (AUL0.7 psi) when they are subsequently coated with silicon dioxide.

The invention claimed is:

1. A process for producing water-absorbing polymer particles by polymerizing an aqueous monomer solution or suspension comprising
   a) at least one ethylenically unsaturated monomer which bears an acid group, which has been neutralized to an extent of 70 to 85 mol %,
   b) at least one crosslinker,
   c) at least one initiator,
   d) optionally one or more ethylenically unsaturated monomer copolymerizable with the monomer specified under a), and
   e) optionally one or more water-soluble polymer, comprising drying a resulting aqueous polymer gel, grinding, classifying and thermal surface postcrosslinking to provide water-absorbing polymer particles, which comprises coating the water-absorbing polymer particles, before, during, or after the surface postcrosslinking, with 0.0001 to 0.25% by weight of silicon dioxide and at least 1.5×10$^{-6}$ mol/g of aluminum cations.

2. The process according to claim 1, wherein the water-absorbing polymer particles are coated with 0.08 to 0.12% by weight of silicon dioxide.

3. The process according to claim 1, wherein the water-absorbing polymer particles are coated with silicon dioxide after the surface postcrosslinking.

4. The process according to claim 1, wherein the water-absorbing polymer particles are coated with 4×10$^{-6}$ to 6×10$^{-6}$ mol/g of aluminum cations.

5. The process according to claim 1, wherein the water-absorbing polymer particles are coated with aluminum cations before the surface postcrosslinking.

6. The process according to claim 1, wherein 75 to 77 mol % of the acid groups of the water-absorbing polymer particles have been neutralized.

7. The process according to claim 1, wherein the amount of crosslinker b) is adjusted such that the water-absorbing polymer particles have a centrifuge retention capacity of 35 to 37 g/g.

8. Water-absorbing polymer particles produced by a process according to claim 1.

* * * * *

UNITED STATES PATENT AND TRADEMARK OFFICE
CERTIFICATE OF CORRECTION

PATENT NO.         : 8,618,206 B2
APPLICATION NO.    : 13/792529
DATED              : December 31, 2013
INVENTOR(S)        : Thomas Daniel et al.

Page 1 of 1

It is certified that error appears in the above-identified patent and that said Letters Patent is hereby corrected as shown below:

On the Title Page:

Item (62), "13/348,442," should be -- 13/378,442, --.

Signed and Sealed this
Twenty-first Day of April, 2015

Michelle K. Lee
*Director of the United States Patent and Trademark Office*